(12) United States Patent
Friberg

(10) Patent No.: US 6,403,886 B1
(45) Date of Patent: Jun. 11, 2002

(54) DISTRIBUTION MEANS

(75) Inventor: Mårten Friberg, Stockholm (SE)

(73) Assignee: Svenska Open Workspace AB, Taby (SE)

( * ) Notice: Subject to any disclaimer, the term of this patent is extended or adjusted under 35 U.S.C. 154(b) by 0 days.

(21) Appl. No.: 09/529,935

(22) PCT Filed: Oct. 21, 1998

(86) PCT No.: PCT/SE98/01901

§ 371 (c)(1),
(2), (4) Date: May 4, 2000

(87) PCT Pub. No.: WO99/21258

PCT Pub. Date: Apr. 29, 1999

(30) Foreign Application Priority Data

Oct. 21, 1997 (SE) ................................. 9703833

(51) Int. Cl.$^7$ ................................................ H02G 3/04
(52) U.S. Cl. ........................................ 174/95; 52/220.5
(58) Field of Search ............................. 174/68.1, 72 A, 174/95, 96, 97, 99 R, 101, 71 R, 72 R, 68.3; 52/220.5

(56) References Cited

U.S. PATENT DOCUMENTS

| | | | | |
|---|---|---|---|---|
| 1,840,536 A | * | 1/1932 | Shore | 174/95 |
| 1,965,182 A | * | 7/1934 | Gerlach et al. | 174/95 |
| 2,079,274 A | | 5/1937 | Baker | |
| 2,756,172 A | * | 7/1956 | Kidd | 174/72 A |
| 2,975,512 A | * | 3/1961 | Somes | 174/99 R |
| 3,243,754 A | * | 3/1966 | Miller | 174/101 |
| 3,825,672 A | | 7/1974 | Malon et al. | |
| 4,471,014 A | * | 9/1984 | den Hartog et al. | 428/182 |
| 4,530,865 A | * | 7/1985 | Sprenger | 428/36 |
| 4,560,828 A | * | 12/1985 | Franckx et al. | 174/71 R |
| 5,665,936 A | | 9/1997 | Sawamura et al. | |
| 5,814,767 A | * | 9/1998 | Katz | 174/68.1 |
| 5,870,849 A | * | 2/1999 | Colson, Jr. | 43/25.2 |
| 6,048,044 A | * | 4/2000 | Biggel et al. | 312/258 |

FOREIGN PATENT DOCUMENTS

| | | |
|---|---|---|
| DE | 3624993 A1 | 1/1988 |
| EP | 0 066559 | 12/1982 |

* cited by examiner

Primary Examiner—Dean A. Reichard
Assistant Examiner—Adolfo Nino
(74) Attorney, Agent, or Firm—Nixon & Vanderhye

(57) ABSTRACT

A device facilitates the distribution of electricity and information signals via separate cables. A flexible cover initially in the form of a band-shaped flexible part with two longitudinal edges allows the edges to be folded inwardly toward each other and removably fastened against a central part of the band-shaped flexible part to form two channels. The channels are spaced from each other a minimum distance (preferably about 50 mm:s) and at least one cable for transmitting electricity is disposed in one channel and at least one cable for transmitting information signals is disposed in the other channel. Edge parts and a central part of the cover may be provided with cooperating hook and loop fasteners to provide a removable connection. A fastening element may also be provided for hanging the device. The device may be delivered in roll form, and unrolled and then acted upon to form the channels.

28 Claims, 1 Drawing Sheet

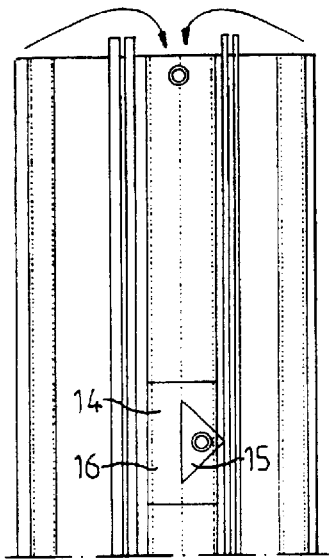
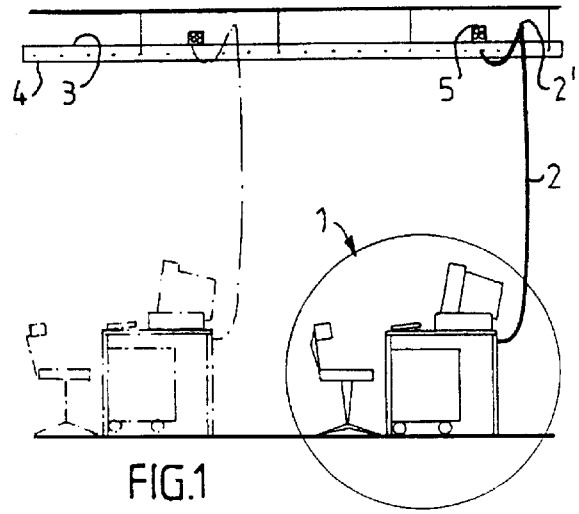
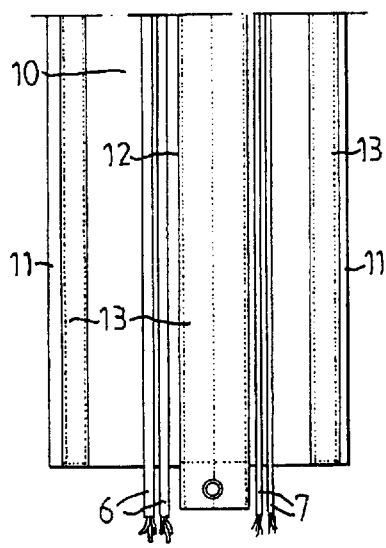
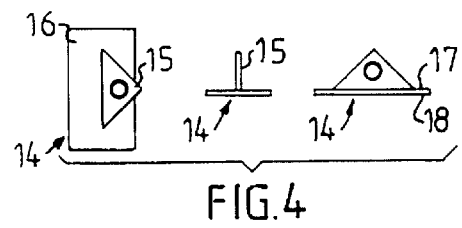
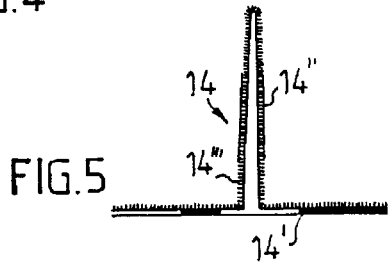
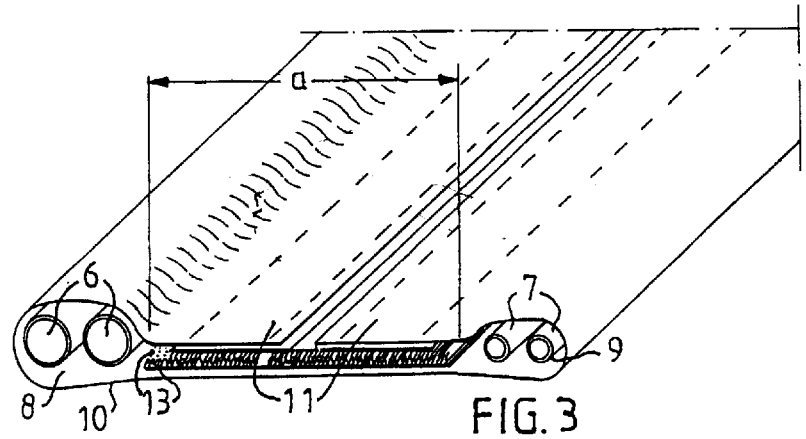

DISTRIBUTION MEANS

CROSS REFERENCE TO RELATED APPLICATION

This is a U.S. national phase of PCT/SE98/01901 filed Oct. 21, 1998.

BACKGROUND AND SUMMARY OF THE INVENTION

The present invention relates to a device for distribution of electricity and information signals via separate cables, comprising a cover for said cables, which is arranged so that a predetermined minimum distance is maintained between cables for electricity and cables for information respectively.

Devices of substantially this kind are previously known. An important field of application for such devices is distribution of both electricity for power supply and information in the form of signals, such as data signals from and to networks and telesignals for telephone, to work stations in open office landscapes, where the devices connect e.g. ceiling based cables carried by cable ladders with actual work stations. whereby high demands are put on localisation flexibility since frequent re-localisation of work stations are often desired.

The most common arrangements for distribution of information and electrical power today are so-called window shelf channels or, in open office solutions, up-right aluminium sections, so called service poles, which are screwed or compressed between floor and ceiling.

Such known devices are associated with problems as far as, primarily, localisation flexibility is concerned. Window shelf channels do substantially not admit freely located work stations. Permanently installed service poles means a non-desired fixation of the location of the work stations in the room and hinders a desired flexibility, which is necessary for an efficient use of personnel and floor space.

The present invention refers to a comparatively cheap and extremely efficient solution of the problems described.

The invention relates to a device for the distribution of electricity and information signals via separate cables. The device comprises a cover for the cable which is positioned and disposed to maintain a predetermined minimum distance between cables which conduct electricity and cables which transmit information signals. The cover is flexible and defines two channels spaced the predetermined minimum distance from each other. In one channel is at least cable conducting electricity, and in the other channel is at least one cable for transmitting information signals.

BRIEF DESCRIPTION OF THE DRAWINGS

Below the invention is described in connection with exemplifying embodiments and the attached drawing, in which FIG. 1 schematically shows a view over a working site connected by means of a device according to the invention, FIG. 2 schematically shows a first embodiment of a device according to the invention in a non-folded state, FIG. 3 schematically shows a sectioned end view of the device according to FIG. 2, in which the device is in a folded state, and FIG. 4 shows a fastening element according to the invention in three different views, and FIG. 5 shows a further embodiment of the fastening element according to the invention.

DETAILED DESCRIPTION OF THE DRAWINGS

In FIG. 1 a working site is designated by 1, which working site is supplied by electrical power and information signals, primarily data and tele, by means of a device 2 according to the invention from ceiling based cables 3 carried by a cable ladder 4 and provided with sockets 5 in the normal way.

Thus, the device according to the invention comprises a cable cover arranged for the maintenance of a predetermined minimum distance between a cable/cables 6 for electrical power a cable/cables 7 for information signals, FIGS. 2 and 3, where said cover is flexible and arranged to form two channels 8, 9 running at said predetermined minimum distance from each other, in which channels 8, 9 a cable/cables of the respective kind is/are meant to run.

According to preferred embodiments, FIGS. 2 and 3, said cover comprises a band-shaped, flexible, bendable and substantially non-elastic part 10, the longitudinally running edge parts 11 of which are arranged to be folded inwardly against each other and preferably removably fastened against a centrally running part 12 of the band-shaped part for the formation of said two channels. Each edge part and the centrally running part are provided with Velcro® (hook and loop fastener) material 13 for the formation of a bur-hook connection.

It is preferred that the channels are arranged to be formed running at said pre-determined distance from each other by the edge parts being folded inwardly against each other substantially edge to edge, as shown in FIG. 3.

A fastening element 14 is arranged for hanging of the device. It is preferred that said fastening element 14 is arranged to be removably fastened to said centrally running part and the edge parts and by means of fastening part 15 protrude between said edge parts in their inwardly folded state, as should be obvious from FIG. 2. In the embodiment shown, FIG. 4, the fastening element comprises a fastening piece 16 having Velcro® material on two opposing side surfaces 17, 18 and a fastening part 15 protruding from one 17 of the side surfaces, e.g. a fastening part having "sharkfin shape", and provided with an eyelet for the cooperation with a ceiling based hook or the like. The fastening element is, according to the embodiment shown, constructed so that the triangular sharkfin part is of a woven fabric and protrudes through one of the Velcro® material parts and is attached by sewing through the two layers of Velcro® material.

In the further embodiment of the fastening element shown in FIG. 5, the element is made of two parts of bendable material with Velcro® material, namely a first horizontal part 14', to which a folded upright eyelet-provided part 14'" is glued. The thus formed part 14" is provided with Velcro® material on both the upper side and the lower side.

The bandshaped part 10 of the cover is preferably made of a dirt and water repellent woven fabric, such as relatively coarse nylon fabric, in lengths of e.g. about 30 meters (the normal piece length of the material) and can be cut to a length suitable for the actual purpose. The material is suitably chosen so that an end seal can be performed by welding in order to avoid splitting. The cover is suitable delivered in rolls in a non-folded state.

The function of the device according to the invention should to a considerable part have been made clear above. Thus, the device is flexible and adaptable as far as length is concerned and fulfils by the distance between the channels and therewith the cables desired of governmental demand, e.g., the European Union (EU) demands of 50 millimeters (mm), for safety distance between power and signal cables for the disturbance safety necessary. The actual EU demands are EU Directive EMC EN 50173. The channels are preferably closeable and openable by the bur-hook connection, whereby the extraction of an actual cable at a free to choose location along the cover may be preformed. Fastening points may be arranged at desired locations along the cover by said fastening elements. In this way, the length between the chosen fastening point of the fastening element, FIG. 1, and a fixed group of sockets (5) in a ceiling or on a cable ladder constitutes, substantially, the radius, within which the working site can be moved with a connection maintained.

As also should have been made clear above, the invention offers a most important improvement compared to prior art since, among other things, an extremely high flexibility, as far as working site location or the corresponding is concerned, is obtained.

Above, the invention has been described in association with exemplifying embodiments. Of course further embodiments and minor changes and complements can be imagined without the substantial inventive idea being left.

Thus, embodiments may be imagined, in which said channels are permanently closed and maintained said minimum distance.

Different solutions for putting together cut lengths of cover may be imagined, e.g. by end located eyelets and a central double part, as shown in FIG. 2.

Thus, the invention should not be considered to be limited to the embodiments given above but may be varied within its frame given by the attached claims.

What is claimed is:

1. A device for the distribution of electrical power and information signals via separate information and electrical power cables, respectively, said device comprising:
   a cover for said information and electrical power cables, which cover is arranged so that a predetermined minimum distance is respectively maintained between said information cables and said electrical power cables, wherein
      said cover includes a band of flexible fabric having opposed longitudinal edge regions which are foldable inwardly so as to form two channels for receiving therein at least one of said information cables and at least one of said electrical power cables, respectively, and wherein
      said two channels are disposed substantially parallel to, and separated from, one another by said predetermined minimum distance.

2. A device according to claim 1 wherein said cover is in a roll configuration from which the cover can be unwound and folded to form said channels.

3. A device according to claim 1, wherein the fabric is a woven fabric.

4. A device according to claim 1, wherein the fabric is a woven nylon fabric.

5. A device according to claim 1, wherein said two channels are formed by the opposed edge regions being folded inwardly into an adjacently opposed edge-to-edge position with respect to one another.

6. A device according to claim 5 wherein said predetermined distance is 50 millimeters.

7. A device according to claim 1 wherein said predetermined distance is 50 millimeters.

8. A device according to claim 7 wherein said cover is in a roll configuration from which the cover can be unwound and folded to form said channels.

9. A device according to claim 1, wherein the band of flexible fabric has a longitudinal central region, and wherein the opposed longitudinal edge regions are arranged so as to be folded inwardly toward each other and removably fastened against the central region of the band to thereby form said two channels.

10. A device according to claim 2 wherein said cover is in a roll configuration from which the cover can be unwound and folded to form said channels.

11. A device according to claim 2 wherein said predetermined distance is 50 millimeters.

12. A device according to claim 9, wherein said opposed edge regions and central region of the band of flexible fabric are provided with hook and loop fasteners.

13. A device according to claim 12 wherein said cover is in a roll configuration from which the cover can be unwound and folded to form said channels.

14. A device according to claim 1, further comprising at least one fastening element arranged for hanging up the device.

15. A device according to claim 14, wherein said fastening element is removably fastened to said central region and includes a fastening part which protrudes between said edge regions when inwardly folded.

16. A device according to claim 15, wherein the fastening element comprises a fastening piece having hook and loop fastener material on two opposing side surfaces, and wherein said fastening part protrudes from one of said side surfaces.

17. A device according to claim 16 wherein said predetermined distance is 50 millimeters.

18. A device according to claim 14 wherein said predetermined distance is 50 millimeters.

19. A device for the distribution of electrical power and information signals comprising:
   information cables for the distribution of information signals;
   electrical power cables for the distribution of electrical power;
   a cover for said information and electrical cables, which cover is arranged so that a predetermined minimum distance is respectively maintained between said information cables and said electrical cables, wherein
      said cover includes a band of flexible fabric having opposed longitudinal edge regions which are folded inwardly towards one another so as to form two channels, each said channel covering respectively at least one of said information and electrical cables, and wherein
      said two channels are disposed substantially parallel to, and separated from, one another by said predetermined minimum distance so that said information and electrical cables therein are likewise separated from one another by said predetermined minimum distance.

20. The device of claim 19, wherein said at least two channels are separated from one another by a predetermined minimum distance of 50 millimeters.

21. A device according to claim 19, wherein the fabric is a woven fabric.

22. A device according to claim 19, wherein the fabric is a woven nylon fabric.

23. The device according to claim 19, wherein said side regions are folded so as to be in edge-to-edge relationship with one another.

24. The device according to claim 19, wherein the band of fabric has a central region, and wherein the edge regions are removably fastened to said central region.

25. The device according to claim 24, wherein the central region and said edge regions include hook and loop fastening material.

26. The device according to claim 19, further comprising a fastening element for hanging the cover.

27. The device according to claim 26, wherein said fastening element is removably fastened to said central region and includes a fastening part which protrudes between said inwardly folded edge regions.

28. A device according to claim 27, wherein the fastening element comprises a fastening piece having hook and loop fastener material on two opposing side surfaces, and wherein said fastening part protrudes from one of said side surfaces.

* * * * *